3,435,744
AUTOMATIC FOCUSING SYSTEM
Allen G. Stimson, Rochester, N.Y., assignor to Eastman Kodak Company, Rochester, N.Y., a corporation of New Jersey
Filed May 31, 1966, Ser. No. 554,072
Int. Cl. G03b *3/10*
U.S. Cl. 95—44                                                15 Claims

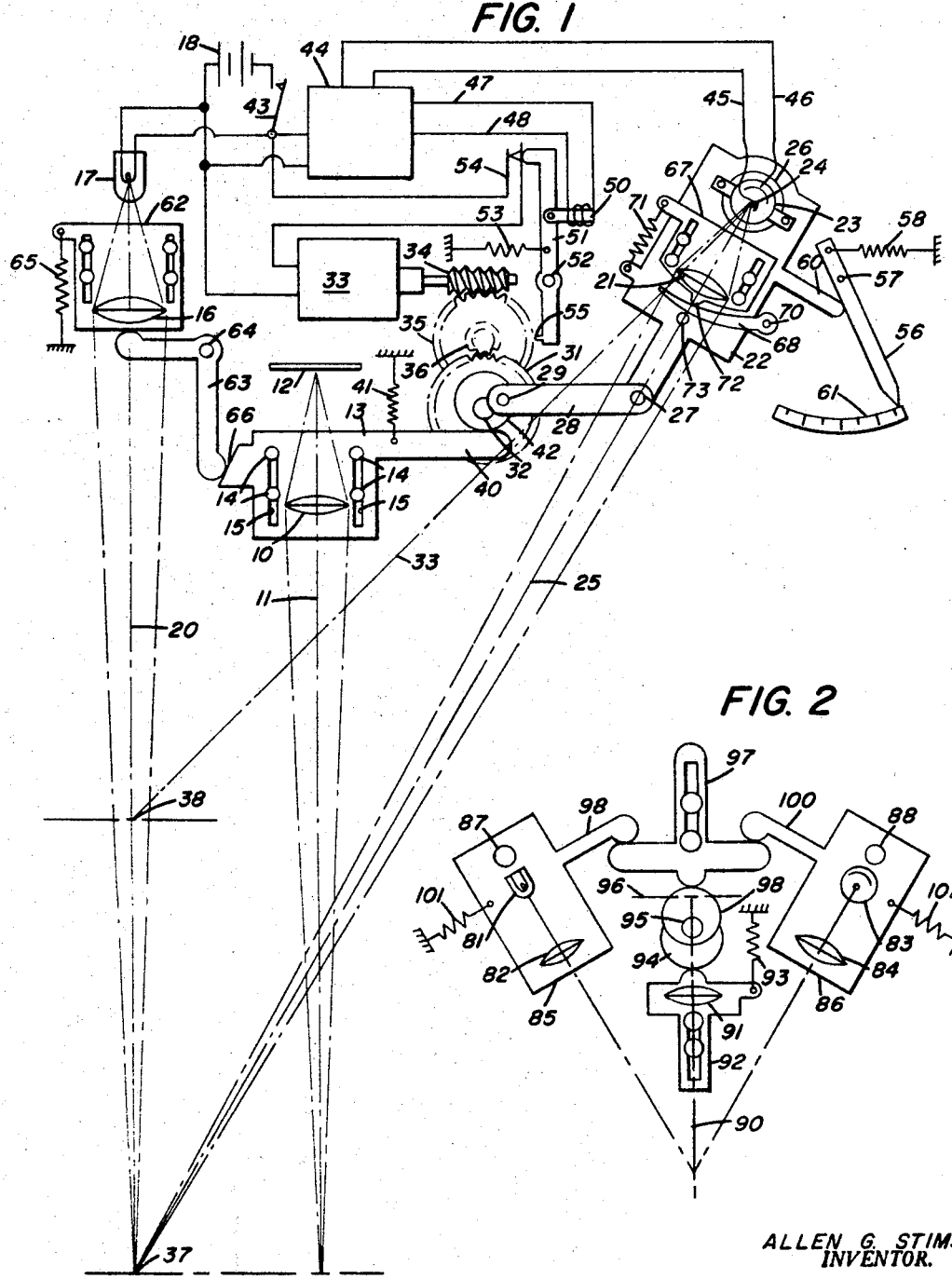

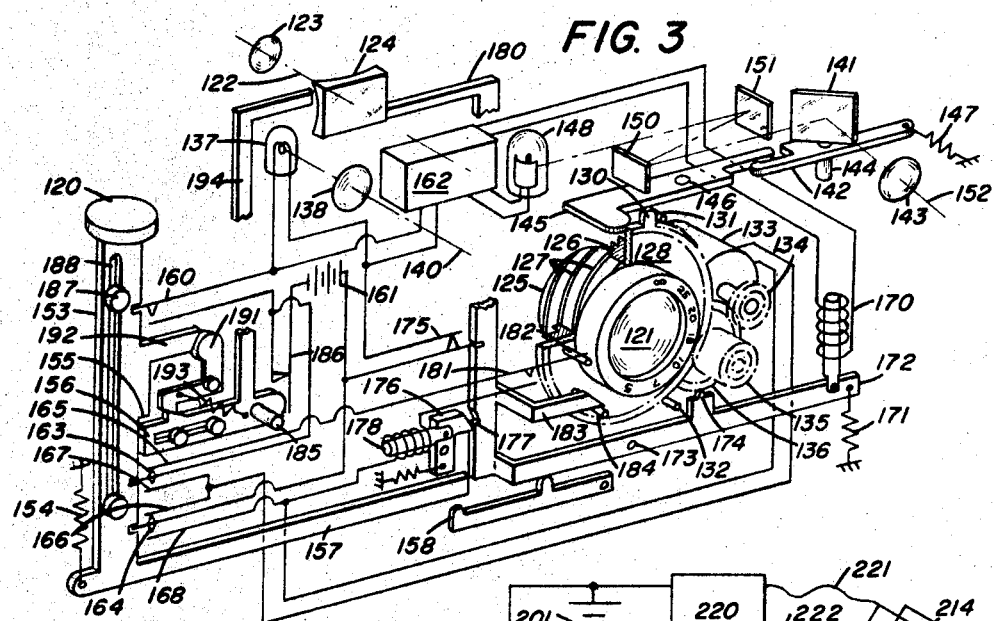
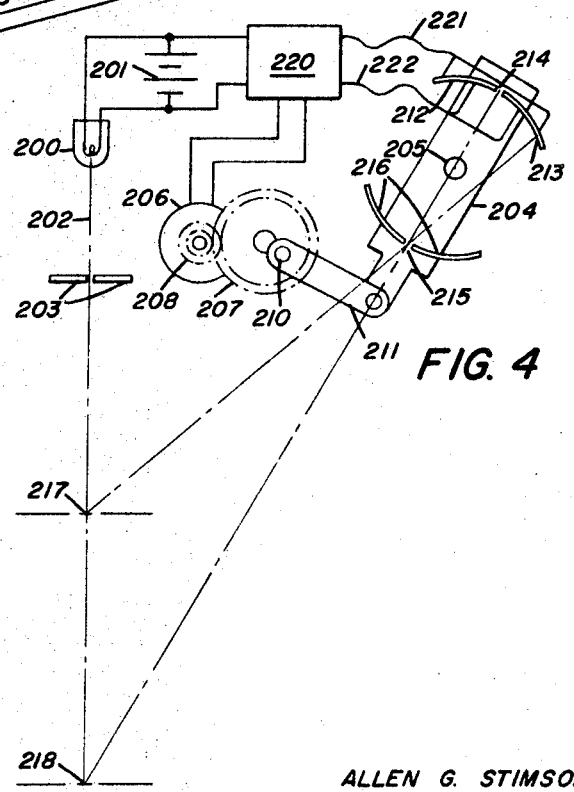
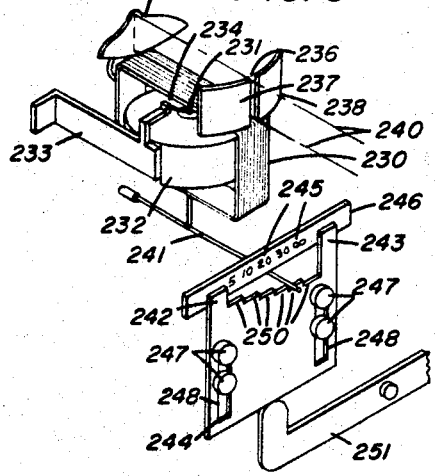
ALLEN G. STIMSON
INVENTOR.
BY Morton A. Polster
Robert W. Hampton
ATTORNEYS

United States Patent Office 3,435,744
Patented Apr. 1, 1969

ABSTRACT OF THE DISCLOSURE

A device for use with photographic cameras for automatically determining the distance from the instrument to a subject to be brought into focus. A beam of light is directed toward the subject from a light source positioned in predetermined relation to the camera. A portion of the light beam reflected back to the camera from the subject is received at a location spaced laterally from the emitted beam. The angle between the emitted and the reflected beams is sensed by bringing the reflected portion of the light beam into alignment with photoresponsive sensors. The angle so sensed is then translated into a corresponding mechanical movement which is a function of the distance from the camera to the subject.

---

The present invention relates to photographic cameras or related optical instruments and, more particularly, to such instruments embodying fully automatic means for determining the distance from the instrument to the object to be brought into focus.

During the evolution of the modern photographic camera, continuing attempts have been made to minimize the numerous visual observations, subjective determinations and manual operations usually involved in adjusting shutter speed, lens aperture and focus of the lens to achieve a photograph of optimum quality. Many cameras now on the market incorporate light meter means which automatically adjust the shutter speed and/or lens opening in response to the illumination of the scene to be photographed. However, although many present day cameras incorporate devices which enable the operator to focus the lens properly by visually observing the quality or composition of one or more images of the subject to be photographed, no commercially successful device has thus far been developed to adjust the focus of the lens automatically without necessitating any such visual observations. Accordingly, many cameras, including some of relatively high price, are now provided with so-called universal focus lenses, which do not require focusing adjustment within the distance range usually encountered by the amateur photographer. Such lenses, however, are a compromise between eliminating focusing preblems and providing an image of optimum quality, and, therefore, are not satisfactory under all conditions.

A primary object of the present invention, therefore, is to simplify the operation of a photographic camera employing a lens adjustable to different focal positions, by providing fully automatic range finding means for determining the distance from the camera to the object to be photographed.

More specifically, it is an object of the invention to determine automatically the distance between the camera and the subject by optical means, without requiring any visual determination by the camera operator as to the quality or composition of an optical image of the subject.

Still another object of the invention is to translate automatically such a distance determination into a corresponding focus adjustment of the camera lens.

Yet another object of the invention is to provide such range finding and lens focusing means which are accurate, dependable and relatively inexpensive.

The basic principle employed in the present invention to accomplish these and other objects thereof, involves directing onto the subject a beam of light emitted from a light source positioned in predetermined relation to the camera; receiving, at a location spaced laterally from the emitted beam, a portion of the beam reflected back to the camera from the subject; sensing the angle between the emitted and the reflected beams by bringing the reflected portion of the beam into alignment with photoresponsive sensing means; and translating the angle so sensed into a corresponding mechanical movement.

The novel features considered characteristic of the invention herein are set forth with particularity in the appended claims. The invention itself, however, both as to its organization and method of operation, together with additional objects and advantages thereof, will best be understood from the following description of illustrative embodiments and from the accompanying drawings in which:

FIG. 1 is a schematic diagram of one embodiment of a range-finder device according to the present invention, including means for focusing the objective lens of an optical instrument in response to the distance between the instrument and the subject;

FIG. 2 is a schematic diagram of another embodiment of a range-finding device according to the present invention, in which the light beam projecting unit and the reflected beam detecting unit are symmetrically disposed on opposite sides of the axis of an axially adjustable lens and are coupled for symmetrical movement, whereby the detected point of impingement of the light beam on the subject is located along such axis at all positions of the range finder mechanism;

FIG. 3 is a schematic perspective illustration of a preferred embodiment of the present invention, incorporated in a photographic camera to determine automatically the distance between the camera and the subject and to effect a corresponding setting of the camera lens;

FIG. 4 is a schematic diagram of still another embodiment of a range-finder device in accordance with the invention, showing an alternate means for detecting the alignment of the reflected beam with the light sensing element thereof; and FIG. 5 is an isometric view of yet another embodiment of a light-sensing means according to the invention, comprising a galvanometer-type electrical measuring instrument adapted to align itself with a light beam, and including means for translating mechanically the aligned position of the movable portion of the instrument to establish the corresponding position of a movable mechanical element.

Referring now to FIG. 1 of the drawing, element 10 represents generally the lens system of a photographic camera or other optical instrument in which a lens system is movable along its axis to focus, at an image-receiving surface illustrated at 12, an image of a subject located along the lens axis. The lens system is moved as a function of the distance between the subject and the lens system. For purposes of illustration, lens system 10 is shown mounted on plate 13, which, in turn, is movably attached to a supporting surface, not shown, by pins 14, which extend through parallel slots 15 to allow sliding movement of the plate along the axis 11, of lens 10.

A second lens system, represented generally at 16, is located in alignment with a light source 17 energized by a battery or other source of electric energy 18, and is adapted to project a beam of light along the lens axis 20 which, in the illustrated embodiment, is located in fixed parallel relation to lens axis 11. Thus, the beam of light will impinge upon a subject located along axis 20, which subject would presumably present a frontal surface generally transverse to the light beam and of sufficient width to also be in alignment with lens system 10, thereby constituting the object intended to be brought into sharp focus by lens 10. Although not shown in the illustration, it is obvious that a conventional viewfinder device could be employed to establish the alignment of lens system 10 with the subject.

The light sensing system employed to detect the spot of light impinged upon the subject and at least partially reflected therefrom, comprises a third lens system, depicted generally at 21, which is mounted on a support member 22 in alignment with a photoelectric device 23, the light responsive portion 24 of which is disposed in alignment with the axis 25 of the third lens system. (While the photoelectric device is represented in the drawing as a photoelectric vacuum tube, other types of similar devices, including photoresistive or photovoltaic solid state devices, can also be employed. Hence, the term photocell, as used herein, is intended to refer to any such device which may be employed in connection with appropriate circuitry to generate or control an electric signal as a function of the illumination impinging on the device.) Support member 22 is pivoted for arcuate planar movement on a fixed shaft 26 which, in the illustrated embodiment, is axially aligned with the light responsive portion of photocell 23. The opposite end of the support member is provided with a pin 27 and is thereby joined, through connecting rod 28, to crank pin 29 which is eccentrically mounted on gear member 31 to move orbitally about the axis of gear shaft 32 as gear 31 is rotated by motor 33 through speed reduction gears 34, 35 and 36.

When a subject is located along axis 20 in the path of the beam of light emitted by light source 17, the beam will impinge upon the frontal surface of the subject and will be at least partially reflected. However, before a portion of the reflected beam can be detected by the light sensing system and generate a corresponding electric signal, the axis 25 of the light sensing system must be positioned to coincide with the frontal reflective surface of the subject along axis 20 to cause the illuminated area on the subject to be focused at the light sensitive portion of the photocell. For example, with the light sensing system positioned as indicated in FIG. 1, its electric signal will be produced only when the frontal reflective surface of the subject is substantially at point 37.

Thus, as the light sensing system is reciprocated arcuately, it scans the portion of axis 20 between point 37 and point 38 and produces an electric signal responsive to the focusing of reflected light onto the sensitive portion of the cell whenever axis 25 traverses a reflective frontal surface along axis 20 between these two points. The distance from the instrument of points 37 and 38 depends, of course, on the particular design of the device. In the case of a camera, points 37 and 38 might correspond, respectively, to the so-called hyperfocal distance (beyond which further focusing adjustment is not normally required) and to the nearest distance at which the camera is intended to photograph a subject.

To effect the automatic focusing of lens 10 according to the distance from the subject to the camera, support member 13 is provided with a cam follower arm 40 which is resiliently biased by a spring 41 into engagement with a cam 42 (secured to gear 31) so that the rotative position of gear 31, and hence the angular position of the light sensing system, correspondingly determines the position of lens 10 relative to image receiving surface 12. While the drawing shows simply a circular cam 42 adapted to increase the distance between lens 10 and surface 12 as the point of coincidence between axes 20 and 25 moves toward the instrument, or vice versa, in actual practice the cam could have a noncircular profile determined by the relative positions of the various optical elements involved and their particular optical characteristics.

The operation of the illustrated device is initiated by closing switch 43, thereby electrically energizing light source 17, motor 33 and an electric transducer device 44 connected to photocell 23 by leads 45 and 46. Transducer 44 is adapted to supply current to energize solenoid 50, through output at leads 47 and 48, whenever photocell 23 responds to the presence of a predetermined increase in light intensity.

As soon as the motor is energized, the light sensing system begins to scan axis 20 between points 37 and 38 and continues to do so until the intersection of axes 20 and 25 coincides with a reflective surface, at which position a portion of the reflected light is focused on the photocell, in response to which solenoid 50 rotates latch arm 51 about pivot 52 against the influence of spring 53 to open switch 54, thereby deenergizing motor 33. To insure instant response of the system independent of the inertia of the motor and other moving parts, the latch arm may also be provided with a tooth 55 which, upon actuation of the solenoid, is interposed between two adjacent teeth of gear 35 to effect an immediate and positive braking action, thus stopping the motion of all the movable elements of the device in appropriate positions as a function of the distance of the subject from the instrument. This distance may also be related as a numeric value by a pointer member, as shown at 56, which is pivotally mounted at pivot 57 and movable against spring 58 by an arm 60 connected to support plate 22, such that the angular position of the support plate may be translated into a direct distance reading by an appropriately numbered scale 61 in alignment with the pointer.

Although the foregoing description has used the term "light" in a general sense in referring to the emitted light beam and the light sensing means, it should be noted that to minimize the possibility of ambient light impinging on the photocell and causing a spurious motion stopping signal, the associated electric transducer device should be so designed as to be responsive only to illumination by a range finder light source of greater intensity than the normally encountered illumination of the subject by other sources. Rather than simply providing an extremely intense source of visible light, however, it is preferable to utilize a photocell which is responsive primarily only to light within a particular spectral frequency range which is not preponderant in normal ambient light, and to provide a light source which emits primarily light within that frequency range. For example, a preferred embodiment of the range-finding device might employ light outside of the ordinary visible spectrum (e.g., infrared or ultraviolet) with other frequency components being minimized both in the emitted beam and in the light received at the photocell by appropriate optical filters. Alternatively, a beam of relatively intense monochromatic light might be employed, for example, by use of an optical laser as the light source, with a corresponding narrow band filter being used in conjunction with the photocell.

While the foregoing explanation describes the essential elements and mode of operation of the device, it may for some purposes also be desirable to further increase the accuracy of the device by insuring not only that the subject is in sharp focus at surface 12 at all times, but also that the lens system 16 and 21 are continuously adjusted so that the point of intersection between axes 20 and 25 is continuously in sharp focus relative to the light source and the photocell. To obtain this objective, the light beam projecting lens 16 is mounted on a plate 62 which corresponds in structure to support member 13 of lens 10, whereby lens 16 may be moved along its axis 20 to vary its position relative to light source 17. This adjustment of lens 16 is effected by a bell crank 63 pivoted at 64, which moves plate 62 against the influence of spring 65 in appropriate relation to the movement of support plate 13 as a function of the profile of cam surface 66 thereon. Likewise, lens 21 is also supported on support member 22 by a similar plate member 67 for movement along axis 25, with the distance between the lens and the photocell being adjusted as a function of the angular position of member 22 by a curved tapered cam arm 68 fixed to a stationary portion of the instrument at 70 and held in by a spring 71 in contacted engagement between lobe 72 at the forward end of plate member 67 and a pin 73 fixed to support member 22.

Referring now to the embodiment of the invention shown in FIG. 2, the light beam projecting device, comprising light source 81 and lens 82 and the light sensing system, comprising photocell 83 and lens 84, are mounted respectively on support plates 85 and 86 symmetrically located at pivot points 87 and 88 on opposite sides of the axis 90 of a lens system 91 of a camera or other optical instrument. Lens system 91, in turn, is supported by a mounting plate 92 movable along axis 90 against the influence of spring 93 by a cam 94 attached to a rotatable shaft 95, to vary the distance between the lens and the image receiving surface depicted at 96. A symmetrical cam follower member 97, positioned in contact with a second cam 98 attached to shaft 95 is also movable along axis 90 in response to the rotation of shaft 95 and is resiliently engaged by the respective arms 99 and 100 of plates 85 and 86 under the influence of springs 101 and 102. In this construction, therefore, the axes of the light beam projecting device and the light sensing system at all times converge at axis 90, such convergence point being kept in focus at surface 96 by lens 91. Such a system, in association with a drive mechanism and associated circuitry as shown in FIG. 1 would, therefore, eliminate entirely the lateral discrepancy between the sensed position of the subject and the axis of the instrument, which might constitute an unacceptable degree of parallax if, for example, the device were to be used for accurate long range measurements in connection with surveying weapon aiming, or the like.

FIG. 3 illustrates a camera having a fully automatic system responsive to depression of the shutter actuating button 120, to first automatically focus the objective lens 121 according to the distance between the camera and a subject located along the axis 122 of the viewfinder comprising lenses 123 and 124, and, thereafter, to actuate the shutter mechanism to effect an exposure.

The embodiment illustrated in FIG. 3, utilizes a rangefinding system which utilizes the same general principle of operation as that previously described in relation to the structure shown in FIG. 1. Objective lens 121 is mounted in a cylindrical housing 125, and is supported in the camera housing, not shown, by a stationary ring 126. The rearward portion of lens housing 125 and the internal surface of ring 126 are provided with mating threads, as shown at 127, whereby the rotation of housing 125 in a counterclockwise direction, as viewed from the front of the camera, moves the lens forwardly away from the film, not shown, and vice versa. Attached to lens housing 125 is a gear member 128 which is rotatable, through somewhat more than a half revolution, between the illustrated position in which lug 130 at the periphery thereof is in contact with a staionary stop pin 131 and a second position in which lug 130 contacts stationary stop pin 132. This rotation of housing 125 is sufficient to move lens 121 axially through its entire range of focal adjustment as indicated by indicia shown on the front surface of the housing adjacent the lens. As hereinafter described, gear 128 may be rotated in the manner just described, either by (1) a reversible electric motor 133 connected thereto through a speed reducing gear train 134, 135 and 136, or (2) by simply rotating the accessible forward portion of housing 125 manually, thereby rotating the motor through the gear train.

The light beam emitting device built into the camera comprises an electrically energized light source 137 mounted at the focal point of a lens 138, the axis 140 of which is parallel to the axis of the objective lens 121. The light sensing device includes a mirror 141, angularly located on support arm 142 behind a third lens 143 and movable about a vertical axis defined by pin 144 pivotally supporting arm 142 on the camera housing. The angular position of mirror 141 is determined by the axial position of the objective lens by means of a follower arm 145 which is pivoted to the housing at 146. One end of the follower arm 145 is held in resilient contact with the back surface of gear member 128 by the contacting engagement of the other end thereof with support arm 142 under the influence of spring 147, whereby a forward movement of the objective lens moves mirror 141 in a clockwise direction, as viewed from the top, and vice versa. Photocell 148 is optically aligned with mirror 141 by means of fixed intermediate mirrors 150 and 151, which serve to increase the focal distance between the lens 143 and photocell 148 and also to increase the optical distance between mirror 141 and the photocell, thereby increasing the movement of a focused spot of light at the photocell in response to a given angular movement of the mirror.

Although each of the light sensing systems previously described in relation to the embodiments illustrated in FIGS. 1 and 2 involves moving a lens relative to a photocell to effect a scanning function, the same result is achieved in this embodiment by moving the mirror behind the stationary lens 143 while simultaneously carrying out a corresponding movement of the objective lens. For example, in the position shown in FIG. 3, the objective lens 121 is in its rearwardmost (hyperfocal) position, and, at the same time, mirror 141 is positioned to focus at the photocell only such light beams as are reflected from a subject located beyond the hyperfocal range of lens 121.

To take a picture with the camera shown in FIG. 3, the operator first brings the photographic subject into the field of the viewfinder. Next, he depresses the shutter actuating button 120 to initiate the operation of the camera by moving slidable member 153 downwardly, against the influence of spring 154. When the camera is set for fully automatic operation, the downward motion of member 153 is limited by engagement of its shoulder 155 with stop member 156. In this position, the shutter release arm 157 of member 153 has not operatively engaged shutter-actuating trigger 158. However, such downward movement of member 153 closes normally open switch 160 in series with a battery 161 to energize light source 137 and an electric transducer device 162 similar to the one described in reference to FIG. 1. Further, such movement of member 153 simultaneously actuates a double-pole double-throw switch comprising movable contact blades 163 and 164, moving such blades out of contact with conductors 165 and 166, respectively, and into contact with conductors 167 and 168. This causes motor 133 to be energized by battery 161 with the proper polarity to drive gear member 128 in a counterclockwise direction, thereby axially moving lens 121 and causing the range-finding system to function as previously described.

When the scanning movement of mirror 141 causes the reflected beam of light to impinge on the photocell 148, transducer 162 energizes a solenoid 170 which, acting against the bias of spring 171, moves actuating arm 172 in a counterclockwise direction about its pivot 173, forcing its tooth 174 between adjacent teeth of gear 136 to cause an immediate and positive stoppage of the drive system. In this embodiment, however, the motor remains energized and is simply stalled by the blocking of gear 136 for so long as the shutter actuating button 120 remains depressed by the camera operator. In addition to blocking the drive mechanism, the counterclockwise movement of actuating arm 172 also causes the downward-moving portion thereof to open switch 175, thereby de-energizing the light source 137 and the transducer 162 to prevent photographing the projected spot of light impinged on the subject. (Even with an infrared range-finding system, the projected spot might otherwise appear in the resulting photograph if the film being used were responsive to such radiation.)

The counterclockwise movement of actuating arm 172 also actuates trigger 158 to release the shutter. For proper functioning of the device, the blocking, light extinguishing and shutter releasing functions should be performed in sequence, and this can be accomplished by adjusting the operation of the various components. For instance, the switch 175 can be opened when tooth 174 has moved sufficiently to block gear 136 but is not yet fully received between the gear teeth, and the operation of trigger 158 can be similarly adjusted or a compensating inertial delay can be built into the shutter mechanism.

As soon as switch 175 is opened, extinguishing light source 137, the signal to transducer 162 is lost, the solenoid 170 is instantly de-energized, and actuating arm 172 is released. However, in order to assure completion of the camera's exposure cycle, the actuating arm 172 can simply be made sufficiently massive to insure the inertial actuation of the trigger mechanism, or, alternatively, a suitable inductance can be designed into the solenoid to delay the instantaneous release of the actuating arm. Nonetheless, it should be noted that, as soon as the actuating arm is released, the previously stalled motor would again begin to move the objective lens and scanning system so long as member 153 remains depressed by the camera operator. Therefore, since such motion would destroy the resolution of an uncompleted exposure and might otherwise occur during a relatively long exposure interval, a spring loaded latch member 176 is provided to engage a notch 177 to retain the actuating arm 172 in the position it assumes when solenoid 170 is actuated, and the latch member 176 remains so engaged until it is released by the energization of a second solenoid 178.

If the range-finding system fails to detect a subject within its operative range, the motor will simply stall when lug 130 engages stop pin 132, with no exposure having been made. To alert the operator to this occurrence, an indicator arm 180 (an extension of actuating arm 172) projects into the viewfinder and remains visible therein until the actuator arm 172 moves to block the focusing mechanism and release the shutter.

When the shutter actuating button 120 is released, slide member 153 is returned by spring 154 to the illustrated position in which switch 160 is open to prevent current from flowing to the light source and the transducer, and in which respective switch blades 163 and 164 are again in contact with conductors 165 and 166 out of contact with conductors 167 and 168. With blades 163 and 164 in this position, the range-finding mechanism is reset: Solenoid 178 releases the latch 176, allowing actuator arm 172 to release gear 136 and member 133, and the motor 133 is energized with opposite polarity, through solenoid 178 and switch 181, to drive gear member 128 clockwise until switch 181 is opened (as illustrated) by pin 182 when gear member 128 has returned to its initial position with lug 130 adjacent pin 131. In this initial position, all electrical components of the system are de-energized.

In the event of a very "close-up" photographic subject, only slight movement of gear 128 may occur before a signal is received by transducer 162 in response to a reflected portion of the projected light beam, presenting the possibility that actuating arm 172 might be moved to its latched position before gear 128 has moved sufficiently to close switch 181, in which case solenoid 178 could not be energized to withdraw the latch 176, and the resetting of the mechanism as just described above would be prevented. To avoid this undesirable possibility, a blocking arm 183, extending from actuating arm 172, is engaged by a pin 184 to prevent movement of the actuator arm to its latched position until gear 128 has moved sufficiently to close resetting switch 181.

The camera structure illustrated in FIG. 3 also provides for manual override of the automatic focusing systems just described. In the event that the automatic range-finder does not detect the subject within its operating range, or that the operator may wish to adjust the lens focus manually for some other reason, this can be accomplished by sliding stop member 156 out of the path of shoulder 155 of slide 153 by means of an externally accessible projection 185. This opens switch 186 to completely isolate battery 161 and at the same time, allows member 153 to be further depressed to its limit of movement as determined by the engagement of pin 187 with the top of guide slot 188. During this additional movement of member 153, its extension 157 contacts and actuates shutter trigger 158, effecting exposure manually.

Stop member 156 might be provided with a simple detent device to retain it selectively either in the manual or automatic position. However, to reduce the possibility of accidentally leaving the stop member in the manual operation position, the illustrated embodiment employs a spring loaded latch element 191 which holds the slidable member 156 out of the path of shoulder 155 until the latter has been moved past the position at which it could be blocked by member 156. Once slide member 153 has been moved past this critical position, the latch 191 is cammed into released position by arm 192 of member 153 and is returned to its former position by spring 193 when the actuating button 120 is released. Additionally, stop member 156 may be provided with a viewfinder extension 194 to give the operator a further visual indication that the automatic range-finder mechanism is disengaged.

In the embodiment of the invention shown in FIG. 4, the light source 200, energized by battery 201, directs a light beam along axis 202, which is restricted to a narrow vertical path by an aperture plate 203. The light sensing portion of the instrument comprises a support plate 204, pivoted at 205 for reciprocating movement by motor 206 which rotates gear 207 by means of motor gear 208. Gear 207 is provided with a crank pin 210 connected to plate 204 by connecting rod 211. In this embodiment, support plate 204 carries two narrowly spaced rectangular photocell elements 212 and 213, with the area 214 between the cells being in alignment with a narrow vertical slit 215 in aperture plate 216. When the light sensing system is rotationally reciprocated by the motor, the axis defined by area 214 and slit 215 scans axis 202 between points 217 and 218. Regardless of the location at the subject along axis 202 between these points, light reflected therefrom will pass through slit 215, and will impinge on one of the photocell elements except when the sensing unit is directly aligned with the illuminated spot on the subject, in which case the reflected beam will fall in area 214 between the photocell elements. Since photocell elements 212 and 213 are connected in parallel relation to the transducer device 220 by leads 221 and 222 to energize motor 206 so long as either photocell element is illuminated, the light sensing system is caused to scan by the presence of a reflective subject along axis 202 between points 217 and 218, such scanning motion being terminated by the de-energization of motor 206 when the support plate 204 is aligned with the reflected light spot on the subject. Such aligned position of plate 204 is translated into a numerical indication of the distance of the subject from the instrument and/or into a corresponding adjustment of a mechanically movable member by means, not shown, corresponding to those previously illustrated and described.

While photocell elements 212 and 213 were previously described as being rectangular, it may be preferable to utilize such elements having frontal profiles which decrease in vertical dimension toward each other, whereby the area upon which the vertical light beam impinges is reduced as the system approaches alignment with the illuminated area of the subject. By utilizing such an arrangement, the motor energizing voltage can be reduced gradually toward an apex (in this case "zero") output as a function of the size of the illuminated area of the photocell, thereby slowing the speed of the motor as the system moves into alignment and reducing the inertia of the drive mechanism which tends to carry plate 204 past the aligned position in which the drive motor is denergized.

FIG. 5 illustrates still another embodiment of a light sensing system which may be incorporated in an automatic range finder as previously described. In this embodiment, the light sensing system utilizes a galvanometer-type electrical measuring instrument comprising a movable coil 230 pivotally supported by two jeweled bearings, one of which is shown at 231, at opposite sides of a permanent magnet 232, supported by a stationary support arm 233. In such an instrument, the angular deflection of the coil against the slight resistance of a hairspring 234 is a function of the amount of current flowing through the coil. In this embodiment, such current is produced by a photovoltaic-type cell 235 mounted on coil 230 in alignment with a vertical slit 236 between aperture plates 237 and 238, which are also supported on the coil and which define a narrow vertical scanning path illustrated by broken lines 240.

The light measuring system shown in FIG 5 may be mounted on a camera or other instrument in the same manner as described in reference to the system illustrated in FIG. 4. The scanning range of the system, is defined by the limits of motion of needle 241, which is attached to the coil for arcuate movement between legs 242 and 243 of step member 244, and so long as the subject is located along the axis of the light source and within the scanning range of the system, light reflected from a subject will always impinge on some portion of the photocell. By profiling photocell 235 so that a maximum are thereof is illuminated when path 240 is aligned with the reflected spot of light at the subject, an apex (maximum) current output is produced at the point of proper alignment, and the system can be made to align itself automatically. With the illuminated spot reflected from the subject being aligned with the maximum cell area, the position of needle 241 is therefore determined by the distance of the subject from the camera as may be indicated by appropriate indicia 245 on stationary anvil member 246.

Alternatively, other means might be employed modifying the embodiment shown in FIG. 5 to cause the electric signal of the photocell to change in a similar manner as the illuminated area moves either way from the aligned central position. For example, instead of/or in addition to varying the area of the photocell, a transparent filter member varying in density toward each end might be moved across the light path by the coil to vary the intensity of the illumination of the photocell as a function of the position of the object. To stabilize such a self-aligning galvanometer system and prevent undue oscillation thereof, it is necessary to determine carefully the desired profile of the photocell, the characteristics of the hairspring, and other operative elements associated with the instrument, as well as to provide appropriate damping means, but such considerations are within the province of persons skilled in the electric meter art.

To translate the position of the needle into a corresponding adjustment of the camera lens or some other element, step plate 244 is slidably supported by stationary pins 247 extending through parallel slots 248 and is provided with a series of steplike surfaces 250, whereby needle 241 is trapped between one of such surfaces and the lower surface of anvil member 246 to block further movement of plate 244 as the plate is moved upwardly by operating lever 251. Accordingly, the blocked position of the plate, and/or the corresponding position of operating lever 251, reflect the angular orientation of the light sensing system and can readily be translated into the desired corresponding mechanical movement needed to focus the optical system.

FIG. 5 represents both the photocell and the associated scanning path defining means as being movable with the coil. However, it should be apparent that the coil might carry only a mirror or some other single moveable element of the light sensing system as has been illustrated by the various embodiments previously described. Although the latter varieties necessitate flexible electrical connections to the coil, they might nevertheless be preferable to reduce the mass of the movable coil structure.

While the various embodiments of the invention herein have been described with reference to instruments having a movable lens or other element separate from the elements of the range-finder device itself, it would also be possible to utilize the instrument lens for purposes of focusing the light beam onto the subject or focusing the reflected beam onto the photocell. For example, to adjust the projection lens of a projector as a function of the distance to the screen, an aperture plate could temporarily be introduced to restrict the projection beam to illuminate only a small spot on the screen for detection by the photocell, and, after the lens was adjusted, the plate could be removed to allow the projector to function in its normal manner. Likewise, in a camera, a mirror could be interposed temporarily behind the camera lens to focus the reflected beam onto the photocell, and then removed after the distance setting had been accomplished, in a manner similar to that employed in the viewfinder device of a single lens reflex camera.

The invention has been described in detail with particular reference to preferred embodiments thereof, but it will be understood that variations and modifications can be effected within the spirit and scope of the invention. Accordingly, the invention is not to be limited to the specific details shown and described, but is of a scope as defined by the appended claims.

I claim:
1. A range finder device for use with a photographic camera having an objective lens adjustable to different focal positions, comprising:
    (a) distance triangulating units comprising:
        (1) light source means for projecting a beam of light toward an object to be photographed to produce an illuminated area on said object when said beam impinges thereon; and
        (2) directional light sensing means spaced from said light source means for producing a predetermined signal when said light sensing means and said area are in alignment;
    (b) drive means for moving at least one of said distance triangulating units to bring said light sensing means and said area into alignment by altering the angular relation between said units;
    (c) braking means responsive to said signal for arresting said drive means when the light sensing means and said illuminated area are in alignment; and
    (d) indicator means operatively connected to at least one of said units to indicate the distance from the camera to said object, said indicator means being positionable as a function of the spatial and angular relation of said triangulating units when said drive means is arrested.

2. The device according to claim 1 wherein said indicator means includes adjustment means operatively connected to at least one of said distance triangulating units to adjust said lens as a function of the spatial and angular relation of said units when the drive means is arrested, whereby the adjusted focal position of said lens corresponds to the distance between the camera and the photographic object.

3. In a camera having a film plane, an objective lens, and focusing means for varying the distance between said lens and film plane, the improvement comprising:

(a) adjustable light source means comprising:
  (1) a light source unit; and
  (2) a first beam focusing unit for projecting a beam of light from said light unit along a narrow first path to produce a localized illuminated area on the subject to be photographed when said first path is aligned therewith;
(b) adjustable light sensing means comprising:
  (1) a photoresponsive unit adapted to produce a predetermined signal when in optical alignment with an illuminated area; and
  (2) a second beam focusing unit defining a narrow second path within which an illuminated area is in signal-producing alignment with said photoresponsive unit, said second path being angularly disposed with respect to said first path and in intersecting relation therewith;
(c) drive means for adjusting at least one of said units to alter the angular relation of said paths and the point of intersection thereof;
(d) disabling means for arresting said drive means in response to said signal when said point of intersection and the illuminated area on the photographic object are in coincidence; and
(e) means operatively connecting the drive means and said focusing means for varying the distance between the lens and the film plane as a function of the position of said drive means.

4. A camera according to claim 3 in which said disabling means comprises a braking member movable between an inoperative position and an arresting position for positively arresting movement of said drive means; and solenoid means for moving said braking member from its inoperative position to its arresting position in response to said signal.

5. A camera according to claim 3 in which said light source means is adapted to project a beam of light substantially within a predetermined spectral frequency range and in which said light sensing means includes corresponding response-limiting means whereby said signal is produced only when said photocell is in optical alignment with an area illuminated by light within that spectral frequency range.

6. A camera according to claim 3 in which said second beam focusing unit comprises a lens portion and a mirror portion disposed behind said lens portion adapted to focus at said photocell an illuminated area in said second path.

7. A camera according to claim 5 in which said predetermined spectral frequency range is outside the visible light spectrum.

8. A camera according to claim 6 in which the disposition of at least one of said portions is adjusted by said drive means to alter the angular relation of said paths.

9. A camera according to claim 8 in which said mirror portion is adjusted by said drive means to alter the angular relation of said paths.

10. An instrument for determining distance between said instrument and an object displaced therefrom comprising:
  (a) light projecting means adapted to illuminate said object by projecting a beam of light thereon;
  (b) sensing means arranged for movement through a predetermined angular displacement for sensing the angular position of an object so illuminated relative to said instrument when the illuminated object is within said predetermined angular displacement, said sensing means being spaced from the light projecting means and comprising:
    (1) photoresponsive means adapted to produce an electrical signal proportional to the amount of light energy impinging upon a photosensitive surface thereof;
    (2) movable means for varying the amount of light energy impinging upon said photosensitive surface from said illuminated object as a function of the angular alignment of said movable means and said object such that said electrical signal level varies from a maximum level in proportion to the movement of said movable means from a position in which said movable means is located in predetermined angular relation to said illuminated object;
    (3) drive means for moving said movable means in at least one direction along a path including said position whereat said maximum signal is produced;
    (4) signal measuring means for measuring said electrical signal as the movable means is so moved;
    (5) disabling means responsive to said electrical signal measuring means for arresting movement of the movable means at said maximum producing position; and
  (c) translating means including a positionable member for translating the arrested position of said movable means into a corresponding adjustment of the position of said member as a function of the distance between the instrument and said object.

11. A construction according to claim 10 in which said electrical signal is an electric current produced by said photoresponsive means and in which said signal measuring means comprises a galvanometer-type electric measuring meter having a member normally biased to a rest position and movable against said bias to a plurality of positions spaced from said rest position by a distance proportional to said current level, said member comprising the drive means for moving the movable means along said path; and said movable means being adapted to vary said signal current from said maximum level in proportion to the movement of the movable means in any direction away from said maximum producing position; whereby the function of said disabling means is accomplished by variations in the current level whenever said movable means moves away from said maximum producing position.

12. A construction according to claim 10 wherein said photosensitive surface has predetermined areas of greater and lesser sensitivity.

13. A construction according to claim 12 wherein when said movable means is located in said predetermined angular displacement to said illuminated object, light energy received from said object strikes said photosensitive surface at its area of greater sensitivity.

14. A construction according to claim 12 wherein when said movable means is located in said predetermined angular displacement to said illuminated object, light energy received from said object strikes said photosensitive surface at its area of least sensitivity.

15. The construction according to claim 10 for use in a photographic camera, said camera including a picture-taking lens, a film plane, and adjustable focusing means for varying the distance between said lens and said plane; and means operatively connecting said positionable member with said focusing means for adjusting camera focus as a function of the distance between the camera and said object.

References Cited

UNITED STATES PATENTS

| | | | |
|---|---|---|---|
| 1,866,581 | 7/1932 | Simjian | 352—140 |
| 3,249,007 | 5/1966 | Stauffer | 352—140 |
| 3,264,935 | 8/1966 | Vose | 352—140 |
| 3,342,102 | 9/1967 | Maxon | 352—140 |

NORTON ANSHER, *Primary Examiner.*

C. B. FUNK, *Assistant Examiner.*